United States Patent
Platzer

(10) Patent No.: US 8,131,319 B2
(45) Date of Patent: Mar. 6, 2012

(54) ACTIVE DISPLAY READABILITY ENHANCEMENT FOR MOBILE DEVICES DEPENDING ON MOVEMENT

(75) Inventor: Kasper Platzer, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 965 days.

(21) Appl. No.: 12/015,831

(22) Filed: Jan. 17, 2008

(65) Prior Publication Data

US 2009/0186659 A1    Jul. 23, 2009

(51) Int. Cl.
*H04M 1/00* (2006.01)
*G09G 5/00* (2006.01)
*H04N 5/228* (2006.01)

(52) U.S. Cl. ........ 455/566; 345/619; 345/671; 345/672; 348/208.2

(58) Field of Classification Search .......... 455/566; 345/619–689; 348/208.1–208.16
See application file for complete search history.

(56) References Cited

U.S. PATENT DOCUMENTS

| 6,317,114 B1 * | 11/2001 | Abali et al. ............ 345/672 |
| 6,591,168 B2 * | 7/2003 | Odinak et al. ............ 701/1 |
| 7,768,537 B2 * | 8/2010 | Tognoni et al. ............ 345/672 |
| 7,903,166 B2 * | 3/2011 | Daly ............ 345/672 |
| 2004/0100419 A1 | 5/2004 | Kato et al. |
| 2005/0154798 A1 | 7/2005 | Nurmi |

FOREIGN PATENT DOCUMENTS

| EP | 1 207 072 A1 | 5/2002 |
| EP | 1207072 A1 * | 5/2002 |
| JP | 07-261727 | 10/1995 |
| WO | 2005/055568 | 6/2005 |

OTHER PUBLICATIONS

Mobilewhack.com article from Sep. 2006 on the Motorola E690 PDA Cell Phone (www.mobilewhack.com/reviews/motorola_e690_pda_phone_photos_leaked.html).*
International Search Report and Written Opinion from corresponding Application No. PCT/EP2008/058996 mailed Sep. 22, 2008.

* cited by examiner

*Primary Examiner* — Dwayne Bost
*Assistant Examiner* — Larry Sternbane
(74) *Attorney, Agent, or Firm* — Renner, Otto, Boisselle & Sklar, LLP

(57) ABSTRACT

A method and apparatus for enhancing the readability of information being displayed on display on a mobile device is disclosed. An amount of movement being exerted onto the mobile device is first measured. If the measured amount of movement is greater than a first predetermined threshold value and lower than a second predetermined threshold value, a picture stabilization algorithm is applied to the information to be displayed on the display. If the measured amount of movement is greater than said second predetermined threshold value, then the information is displayed with a larger font size than normal.

18 Claims, 2 Drawing Sheets

ACTIVE DISPLAY READABILITY ENHANCEMENT FOR MOBILE DEVICES DEPENDING ON MOVEMENT

TECHNICAL FIELD OF THE INVENTION

The present invention relates to the display of information on a mobile device and more particularly to a method and apparatus for enhancing the readability of information being displayed on a display in a mobile device.

DESCRIPTION OF RELATED ART

Over the past 20 years the use of mobile devices such as cell phones, personal digital assistants, digital cameras, digital music players, etc. has skyrocketed. In addition, the functions that each mobile device can perform have increased greatly. The previously separate functions of cell phones, digital cameras, PDAs and digital music players can now be found in a single portable electronic device. Thus, these mobile devices are now a part of many people's daily life.

These mobile devices all have a display screen for displaying various types of information to the user. One problem inherent with mobile devices is that the display screen must be rather small in order to maintain its portability. As a result, the information displayed on the display screen is displayed using small text and pictures.

When a person is on the move, e.g., walking, traveling in a car, etc., with their mobile device, the information being displayed may be hard to read or see due to the movement/vibration of the mobile device. As a result, the movement/vibration interferes with the person's use and enjoyment of the mobile device.

Thus, there is a need for a method and apparatus for enhancing the readability of information being displayed on the mobile device.

SUMMARY OF THE INVENTION

According to some embodiments of the invention, a method for enhancing the readability of information being displayed on display on a mobile device, comprising the steps of: measuring the amount of movement being exerted onto the mobile device; if the measured amount of movement is greater than a first predetermined threshold value and lower than a second predetermined threshold value, applying a picture stabilization algorithm to the information to be displayed on the display; if the measured amount of movement is greater than said second predetermined threshold value, displaying the information with a first larger font size.

According to another embodiment of the invention an apparatus for enhancing the readability of information being displayed on a display in a mobile device, comprising: an orientation sensor for measuring the amount of movement being exerted on the mobile device; a processor for determining whether the measured amount of movement is greater than a first predetermined threshold value and below a second predetermined threshold value, wherein the processor applies a picture stabilization algorithm to the information to be displayed when the measured movement is between the first and second threshold values; said processor for increasing the font size used to display the information when the measured movement is above the second threshold value; said display for displaying the information.

Further embodiments of the invention are defined in the dependent claims.

It is an advantage of embodiments of the invention that the readability of information displayed on a display screen can be enhanced when the mobile device is subject to movement.

BRIEF DESCRIPTION OF THE DRAWINGS

Further objects, features and advantages of embodiments of the invention will appear from the following detailed description of the invention, reference being made to the accompanying drawings, in which.

DETAILED DESCRIPTION OF EMBODIMENTS

The present invention will now be described in terms of specific, example embodiments. It is to be understood that the invention is not limited to the example embodiments disclosed. It should also be understood that throughout this disclosure, where a process or method is shown or described, steps of the method may be performed in any order or simultaneously, unless it is clear from the context that one step depends on another being performed first. Also drawings and embodiments which illustrate the inventive concepts are not mutually exclusive. Rather each example has been tailored to illustrate a specific concept discussed. In some cases, elements shown in a particular drawing coexist with others shown in a different drawing, but only certain elements or steps are shown for clarity. It should also be pointed out that references made throughout this disclosure to figures and descriptions using terms such as top, bottom, left, right, vertical, horizontal, etc., are used merely for convenience, and refer only to the relative position of features as shown from the perspective of the reader.

Some terminology used within this disclosure has its ordinary and customary meaning within the art. Otherwise, terms may be explained as they come up in the descriptions herein. However, it would be helpful to understand a few terms as specifically used herein. When a mobile device or terminal is referred to as having an "operating mode" what is meant is that the device is in a mode to be used as a camera, or a terminal, as the case may be. The terminal mode and terminal functions of devices according to embodiments of the invention are not, however, limited to a communication mode and communication functions. Mobile devices may have additional terminal functions including those related to acting as a voice recorder, music player, game console, and other devices, basically, any functions historically associated with computing terminals, mobile phones, or any other similar type of device having a processor.

Embodiments of the invention will be disclosed herein in the context of a specific type of mobile device, a mobile terminal of the cellular telephone type, which includes imaging functions and communication functions. The communication functions and a communication mode of operation are but examples of terminal functions associated with a terminal mode of operation. The concepts of the invention are not limited to the specific embodiments described. In particular, the concepts can be applied regardless of the display technology, keypad technology, or type of housing used. The particular mobile device or terminal involved may be a personal communication system (PCS) terminal which can include data processing, facsimile, and data communication capabilities. As previously mentioned, the mobile device in which the invention is implemented can encompass personal digital assistants, Internet access devices, organizers and computers.

Figure 1:
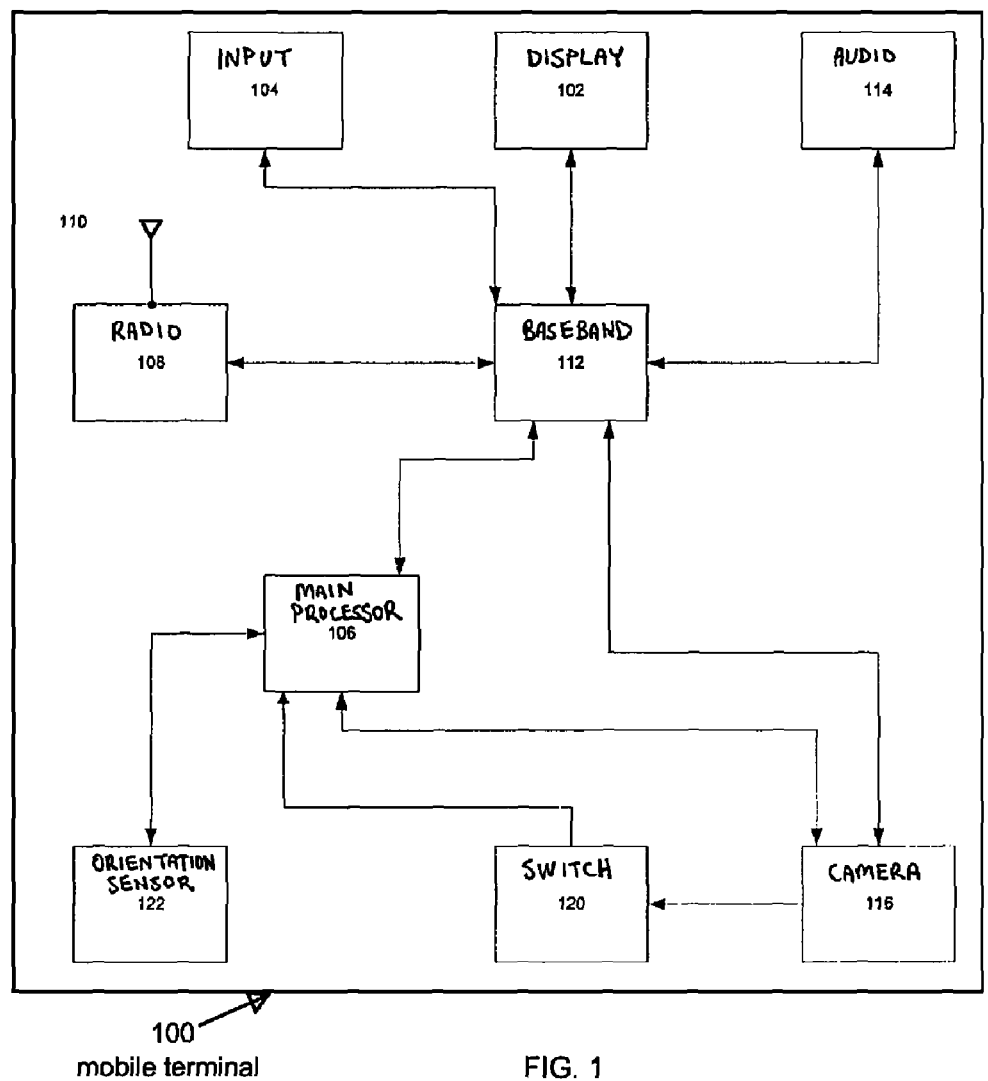
FIG. 1 illustrates a mobile device according to one embodiment of the invention.

FIG. 1 is a functional block diagram of the hardware components of the mobile terminal 100 which can implement some embodiments of the invention. FIG. 1 includes the components which implement the means to carry out at least some of the processes specifically described herein, as well as other functions typically associated with a mobile device of the mobile radio telephone device. Mobile terminal 100 can include a display 102 and an input block 104. These two blocks in conjunction may be used to implement soft keys, otherwise, the input block 104 can include traditional buttons using any technology. The input block 104 may include buttons, soft keys, or touch screen menus. The main processor platform 106 controls the overall operation of the terminal. This platform includes a processor which controls many of the functions of the phone. This platform can also include computer code in the form of firmware, microcode, software, etc. which uses the processor to execute various functions on the terminal. The mobile terminal 100 of FIG. 1 also includes a radio block 108 which provides an air interface to a wireless communication network in this example. The terminal's antenna system, 110, is connected to radio block 108. The baseband logic block 112 provides basic signal processing, for example, synchronization, channel coding, decoding, and burst formatting, as is understood in the art. The audio interface block 114 handles voice as well as analog to digital processing. It also receives input through a microphone and produces output through a speaker in the case of a mobile terminal device as is illustrated in this example. The baseband block 112 also performs some of the processing images received through an imaging device, in this example, a camera 116.

The camera 116 may also include a lens cover. This lens cover has a built-in switch 120 which reports the status of the lens cover to the main processing platform 106. A lens cover of this type typically slides open on molded or metallic tracks, as is known in the art. The processor 106 can be informed of the status of the lens cover via switch 120, and act accordingly. In addition, an orientation sensor 122 can be connected to provide input to a processor in the mobile terminal. The orientation sensor 122 may be used to determine the orientation of the mobile device 100. In addition, the orientation sensor 122 can measure the amount of movement/vibration that is being exerted on the mobile device 100 by external forces. Orientation sensors are typically accelerometers but the invention is not limited thereto. Movement is determined by integrating acceleration over time. Movement can be determined in 2 (display plane) or 3 dimensions, depending on the capabilities of the sensor.

Figure 2:
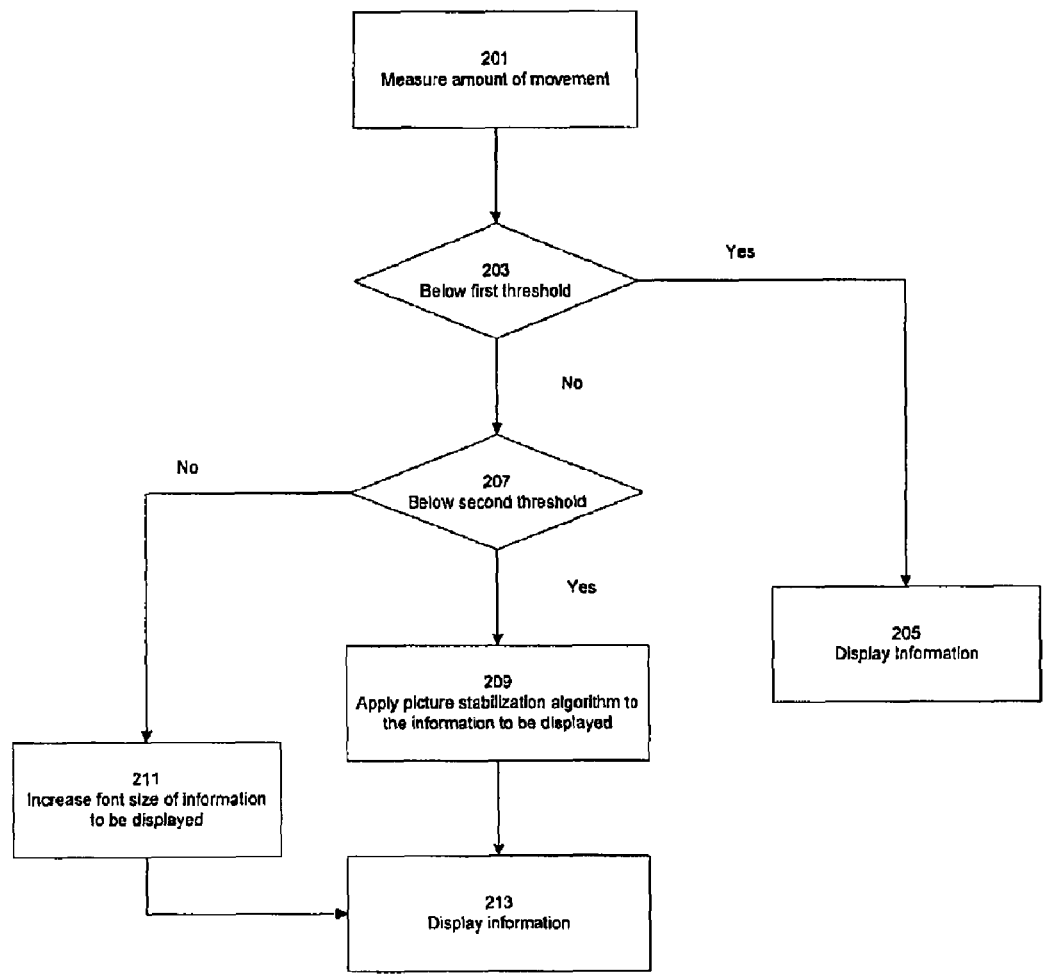
FIG. 2 is a flow chart illustrating the operation of a mobile device according to one embodiment of the invention.

The operation of the mobile device will now be described with reference to FIG. 2 according to one embodiment of the invention. In step 201, the orientation sensor 122 measures the amount of movement being applied to the mobile device. The main processor platform 106 then determines if the amount of movement is below a first predetermined threshold value in step 203. If the amount of movement is below the first predetermined threshold value, the information for display is processed in the normal manner and displayed on the display 102 in step 205. However, if it is determined that the amount of movement is above the first threshold value, the main processor platform 106 then determines if the amount of movement is below a second threshold value in step 207. If it is determined that the amount of movement is below the second threshold value, the main processor platform 106 applies a known picture stabilization algorithm to the information to be displayed in step 209. This will cause the information to appear in a more readable form when the processed information is displayed on the display 102 in step 213. If it is determined that the amount of movement is greater than the second threshold value in step 207, the main processor platform 106 changes the font of the information to be displayed to a larger font size than is normally used to display the information in step 211.

It will be understood by those skilled in the art that the first and second thresholds can be product specific. For example, the first threshold may be considered exceeded when movement compensation is bigger than one display pixel size and the frequency of the movement is too big for the eye to follow. The second threshold may be considered exceeded when the movement in the display plane is too big for the displays active area to compensate or when the frequency of the movement is higher than the maximum refresh frequency of the display but the invention is not limited thereto.

The information is then displayed on the display 102 in step 213 with the larger font size. Since the information is being displayed using a larger font size, the readability of the information is enhanced despite the movement of the mobile device 100.

According to one embodiment of the invention, various font sizes may be used for different amount of movement greater than the second predetermined threshold. For example, assume that the standard font size used on a mobile device is font size 10. When the amount of movement is above the second threshold value and below a third threshold value the font size used to display the information may be changed from 10 to 12. When the amount of movement is above the third threshold value and below a fourth threshold value, the font size used to display the information may be changed from 10 to 14. When the amount of movement is above the fourth threshold value, the font size is changed from 10 to 16. It will be understood by those skilled in the art that there may be any number of threshold values can be used and the invention is not limited thereto. Furthermore, it will be understood by those skilled in the art that different font sizes can be used for each threshold and the invention is not limited thereto.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. It should be appreciated that the different features and steps of the invention may be combined in other combinations than those described. The scope of the invention is only limited by the appended patent claims.

What is claimed is:

1. A method for enhancing the readability of information being displayed on a display of a mobile device, comprising the steps of:
   measuring an amount of vibration movement being exerted onto the mobile device;
   if the measured amount of vibration movement is greater than a first predetermined threshold value and lower than a second predetermined threshold value, applying a picture stabilization algorithm to the information to be displayed on the display;
   if the measured amount of vibration movement is greater than said second predetermined threshold value, displaying the information with a first larger font size.

2. The method according to claim 1, wherein said movement is greater than the first predetermined threshold when movement compensation is bigger than one display pixel size and frequency of the movement is too large for an eye to follow.

3. The method according to claim 1, wherein said movement is greater than the second predetermined threshold when frequency of movement is higher than maximum refresh rate of the display.

4. The method according to claim 1, wherein said movement is greater than the second predetermined threshold when movement in the display plane is too large for the display's active area to compensate.

5. The method according to claim 1, wherein said mobile device is a cell phone.

6. The method according to claim 1, wherein said mobile device is a personal digital assistant.

7. The method according to claim 1, wherein said mobile device is a computer.

8. The method according to claim 1, further comprising the step of:
displaying the information with at least a second larger font size when the measured amount of movement is greater than a third predetermined threshold value.

9. An apparatus for enhancing the readabilty of information being displayed on a display in a mobile device, comprising:
an orientation sensor for measuring an amount of vibration movement being exerted on the mobile device;
a processor for determining whether the measured amount of vibration movement is greater than a first predetermined threshold value and below a second predetermined threshold value, wherein the processor applies a picture stabilization algorithm to the information to be displayed when the measured vibration movement is between the first and second threshold values;
said processor for increasing the font size used to display the information when the measured vibration movement is above the second threshold value; and
said display for displaying the information.

10. The apparatus according to claim 9, wherein said movement is greater than the first predetermined threshold when movement compensation is bigger than one display pixel size and frequency of the movement is too large for an eye to follow.

11. The apparatus according to claim 9, wherein said movement is greater than the second predetermined threshold when frequency of movement is higher than maximum refresh rate of the display.

12. The apparatus according to claim 9, wherein said movement is greater than the second predetermined threshold when movement in display plane is too large for the displays active area to compensate.

13. The apparatus according to claim 9, wherein said mobile device is a cell phone.

14. The apparatus according to claim 9, wherein said mobile device is a personal digital assistant.

15. The apparatus according to claim 9, wherein said mobile device is a computer.

16. The apparatus according to claim 9, wherein the processor increases the font size used to display the information to at least a second larger font size as the amount of movement increases over a third predetermined threshold value.

17. The method according to claim 1, wherein said first predetermined threshold value is a first amplitude threshold for an amplitude of said measured amount of vibration movement, and said second predetermined threshold value is a second amplitude threshold for said amplitude of said measured amount of vibration movement, said second amplitude threshold being larger than said first amplitude threshold.

18. The apparatus according to claim 9, wherein said first predetermined threshold value is a first amplitude threshold for an amplitude of said measured amount of vibration movement, and said second predetermined threshold value is a second amplitude threshold for said amplitude of said measured amount of vibration movement, said second amplitude threshold being larger than said first amplitude threshold.

* * * * *